(12) United States Patent
Johansson et al.

(10) Patent No.: US 7,876,695 B2
(45) Date of Patent: Jan. 25, 2011

(54) COMMUNICATION STATION AND METHOD PROVIDING FLEXIBLE COMPRESSION OF DATA PACKETS

(75) Inventors: Ingemar Johansson, Luleå (SE); Ghyslain Pelletier, Boden (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 660 days.

(21) Appl. No.: 11/534,404

(22) Filed: Sep. 22, 2006

(65) Prior Publication Data
US 2007/0211724 A1    Sep. 13, 2007

Related U.S. Application Data

(60) Provisional application No. 60/743,422, filed on Mar. 7, 2006.

(51) Int. Cl.
    *G01R 31/08* (2006.01)
(52) U.S. Cl. ............... 370/252; 370/392; 709/247
(58) Field of Classification Search ............. 370/252, 370/328, 331, 349, 389, 392, 394, 477; 709/247
    See application file for complete search history.

(56) References Cited

U.S. PATENT DOCUMENTS

| | | | |
|---|---|---|---|
| 5,796,441 A * | 8/1998 | Oshita | 348/476 |
| 6,618,397 B1 * | 9/2003 | Huang | 370/474 |
| 6,657,997 B1 * | 12/2003 | Lide et al. | 370/356 |
| 2005/0074024 A1 * | 4/2005 | Kim et al. | 370/432 |
| 2005/0160184 A1 * | 7/2005 | Walsh et al. | 709/247 |
| 2006/0067324 A1 * | 3/2006 | Kim et al. | 370/395.2 |

OTHER PUBLICATIONS

Bormann, et al. "RFC 3095, RObust Header Compression (ROHC): Framework and four profiles: RTP, UDP, ESP, and uncompressed.", Jul. 2001, p.p. 1.*

* cited by examiner

*Primary Examiner*—Jayanti K Patel
*Assistant Examiner*—Jung Park

(57) ABSTRACT

A method and a communication station for determining a packet format of a data packet based on at least one compressed header information field. A header packet format of a data packet is determined based on the determined packet format of a partially or completely compressed header information part. The station may also determine a codec rate based on the result of a previously performed compression of at least one header information field. In one embodiment, internal cross-layer signaling from a header generator module to a payload generator module in the communication station is used for signaling information associated with determining the header packet format of the data packet. The method reduces bandwidth fluctuations associated with services such as text messaging audio, or audiovisual services; lowers the delay variations and the erasure rates for application media streams; and provides for faster set-up of sessions.

4 Claims, 13 Drawing Sheets

- IR packet
  - Initialization
  - Complete update

About 40/60 octets

- IR-DYN packet
  - Dynamic update 18 or more octets

- Packet Type 2 (UOR-2)
  - With non-trivial extensions 3 octets + extensions (1, 2, 3 or more octets)

- Packet Type 1 (UO-1, R-1)
  - Sequence number + Timestamp + CRC 2 octets + extensions (1, 2, 3 or more octets)

- Packet Type 0 (UO-0, R-0/-CRC)
  - Sequence number + CRC (*except R-0*)

1-2 octets

Fig. 3

COMMUNICATION STATION AND METHOD PROVIDING FLEXIBLE COMPRESSION OF DATA PACKETS

CROSS-REFERENCE TO RELATED APPLICATIONS: NOT APPLICABLE

This application claims the benefit of U.S. Provisional Application No. 60/743,422, filed Mar. 7, 2006, the disclosure of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates generally to packet communications and, more particularly, to a communication station and method providing flexible compression techniques in packet communications.

Today many audio or audiovisual applications in wireless systems often have a very limited flexibility with respect to the transport channel. The channels may have fixed throughput rates such as in GERAN/EDGE channels and UTRAN/DCH channels. Even though more flexible radio bearers are being designed (e.g., HSxPA channels), channels with fixed bandwidth may be used at cell borders or in legacy hardware. It is expected that different application streams, such as RTP streams and RTCP streams, may be transported on different bearers, but they will still interfere to some extent with each other in terms of contention for the same transmission resources.

For some speech source coders (e.g., AMR-NB, AMR-WB, EVRC, SMV and VMR), it is possible for the application to control the maximum rate during speech activity. Speech codecs such as IS-733, EVRC, SMV and VMR may also reduce their average rate during activity. The activity rate is then reduced over a longer period of time frame than a speech frame. On top of the source coding rate adjustments, the application may also control the bandwidth of the IP/UDP/RTP overhead by aggregating several 20 ms source frames before transport. Alternatively, the IP/UDP/RTP overhead may also be compressed using header compression (HC) techniques. Several HC protocols include Internet Engineering Task Force (IETF) request for comments (RFC) 1144 (Van Jacobson (VJ)), RFC 2507 (Internet Protocol Header Compression (IPHC)), RFC 2508 (Compressing Real-time Transport Protocol (CRTP)) and RFC 3095, 3759 (RObust Header Compression (ROHC)).

Header compression (HC) minimizes the necessary bandwidth for information carried in headers on a per-hop basis over point-to-point links. Header compression takes advantage of the fact that some fields in the headers are not changing from packet to packet within a particular flow of transmitted information, or change with small and/or predictable values. Header compression schemes make use of these characteristics and send static information only initially, while changing values are sent with their absolute values or as differences from packet to packet. Completely random values are preferably sent without any compression at all. One can usually consider a header compression scheme as a type of state machine, and the challenging task is to keep the compressor and decompressor states, called contexts, consistent with each other while keeping the header overhead as low as possible.

U.S. Pat. No. 6,556,587 describes a method and apparatus for a soft state header compression scheme where a real-time communication signal can be updated during signals of inactivity. The header compression soft state in U.S. Pat. No. 6,556,587 can also be updated by stealing bits from the communication signal to carry the header update information. If the communication signal includes source encoded data, the header compression soft state can be updated selectively based on the bit rate of a codec that produced the source encoded data.

Korean patent application KR-2005017083 shows a network system and controlling method for transmitting a data packet having a compressed header. A ROHC compression releasing unit releases a compressed header of a data packet based on the compression releasing context, and generates a feedback message if the compression releasing context and a compression context are inconsistent.

U.S. Pat. No. 6,608,841 provides for a header compression and reconstruction method establishing a context state for non-changing header fields and first order differences for changing header fields between the compressors and decompressors of two communicating terminals. The header compression scheme requires that, when a second-order difference of a field is non-zero, not only a particular RTP packet whose second-order difference is non-zero is sent with the new first-order difference, but also those following packets are sent with the first-order difference as long as certain conditions are fulfilled.

What is needed in the art is a communication station and method for flexible compression in packet communications that overcomes the shortcomings of the prior art. The present invention provides such a communication station and method.

BRIEF SUMMARY OF THE INVENTION

The objectives of the present invention include, but are not limited to, reducing bandwidth fluctuations of applications and services such as, for example, audio or audiovisual services, lowering the delay variations and the erasure rates for application media streams, and providing for a faster set-up of sessions.

The present invention provides for a method and a communication station for determining a packet format of a data packet based on at least one compressed header information field. According to various embodiments of the invention, the determining of a packet format, e.g. a header packet format, of a data packet is dependent on the determined packet format of a partially or a completely compressed header information part.

The present invention further provides for a method and a communication station for generating the compressed data of a data packet dependent on the determined packet format for a partially compressed header. According to different embodiments of the present invention, the determining of a packet format of a data packet and/or the compressed payload data of a data packet is based on at least one compressed header information field of a dummy packet.

The scope of the present invention further includes a method and a communication station for determining an application rate, e.g. a codec rate, based on the result of a previously performed compression of at least one header information fields. According to a particular embodiment of the present invention, internal cross-layer signaling from a header generator module to a payload generator module in the communication station is used for signaling information associated with the determining of the packet format, e.g. the header packet format of the data packet.

Further embodiments of the present invention include a method and a communication station for determining the size of the payload part and/or the header part of a data packet based on the result of a previously performed compression of at least one header information field. Some embodiments of the present invention provide for a method and communication station for determining whether to drop a data packet and/or whether to use inter-coding for encoding the data packet and/or a data packet following the data packet.

BRIEF DESCRIPTION OF THE DRAWINGS

In the following, the essential features of the invention will be described in detail by showing preferred embodiments, with reference to the attached figures in which:

FIG. 3 shows the structures and sizes of different packet formats which can be used in conjunction with the present invention;

DETAILED DESCRIPTION OF THE INVENTION

An audio or audiovisual application source consumes a varying amount of bandwidth due to source characteristics. For example, for a conversational speech service of today, the application will use a time varying bandwidth in the range of 0 to 32 kbps. An audiovisual service of today will typically consume a time varying bandwidth of 32-128 kbps. The present invention aims to solve or alleviate the problems with high delay variations and erasure rates for application media streams that originate from the varying bandwidth of applications and services due to such varying source characteristics.

However, the problem with the varying bandwidth of applications and services such as audio or audiovisual services could also be derived from the characteristics of the packet or header compression protocol in use. The header and/or packet size variation of data packets today cannot be modeled using a deterministic function, and this makes it difficult to set the most appropriate application rate (e.g., the codec rate) for the application. The issue of setting the most appropriate application rate, in turn, often leads to a varying packet size for the media flow and a varying bandwidth for the application and/or service. The present invention identifies the problem with varying packet sizes for the application media flow and takes advantage of the characteristics of the packet or header compression protocols in use (for example the ROHC header compression protocol, which will be discussed in more detail below).

Figure 1:
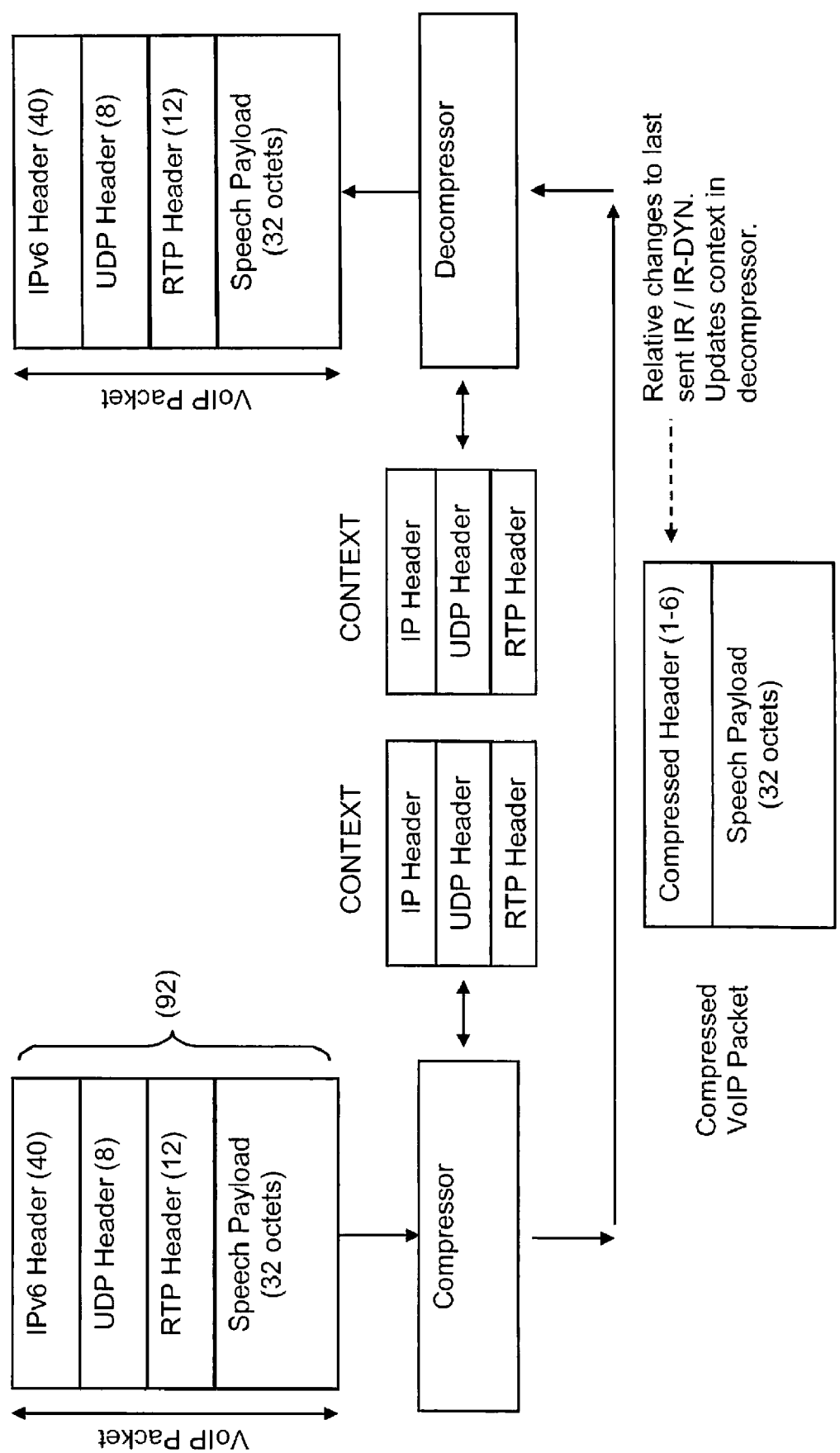
FIG. 1 illustrates a typical example of processing and transmitting audio information between two communication stations in a header compressed data packet format which can be used in conjunction with the present invention.

FIG. 1 illustrates a typical example of processing and transmitting audio information between two communication stations in a header compressed data packet format which can be used in conjunction with the present invention. For simplicity reason, the example given in FIG. 1 shows transmitting audio information in a header compressed Voice over IP (VoIP) packet. The scope of protection for the method and communication station of the present invention should, however, not be limited to cover only applications for audio information, but should also include applications for messaging and data types such as text, still image, or video. A communication station in the present patent application may be, for example, a mobile phone, a Personal Digital Assistant (PDA), a laptop computer, a Personal Computer (PC), or the like.

The original ROHC RFC 3095 defines a framework for header compression, along with compression protocols (profiles) for IP/UDP/RTP, IP/UDP, and also a profile for uncompressed packet streams. The ROHC IR and IR-DYN packets formats defined in RFC 3095 are used for communicating static and/or dynamic parts of a context. For each of the compression profiles defined in RFC 3095, there is a single last header in the header chain that clearly marks the termination of the static chain. The length of the dynamic chain is then inferred from the static chain in the IR header itself, or from the static chain in the context of the IR-DYN header. The length of both static and dynamic chains may thus be of arbitrary length and may, in theory, initialize a context with an arbitrary number of IP levels. Even if many of the examples and embodiments in this patent application for reasons of simplicity relates to the ROHC header compression protocol, the present invention shall, however, not be limited to cover only the ROHC protocol but is also applicable for any other header compression protocol and/or packet compression protocol.

The size of the ROHC packet format used at initialization or for complete updates of the header information fields, the IR packet format, has typically roughly the same size as the uncompressed IP header, which in itself is relatively large with respect to e.g. the payload size used for voice. The ROHC packet format used for dynamic updates of the header information fields, the IR-DYN packet format, typically has a smaller size than the IR packet format.

Figure 2:
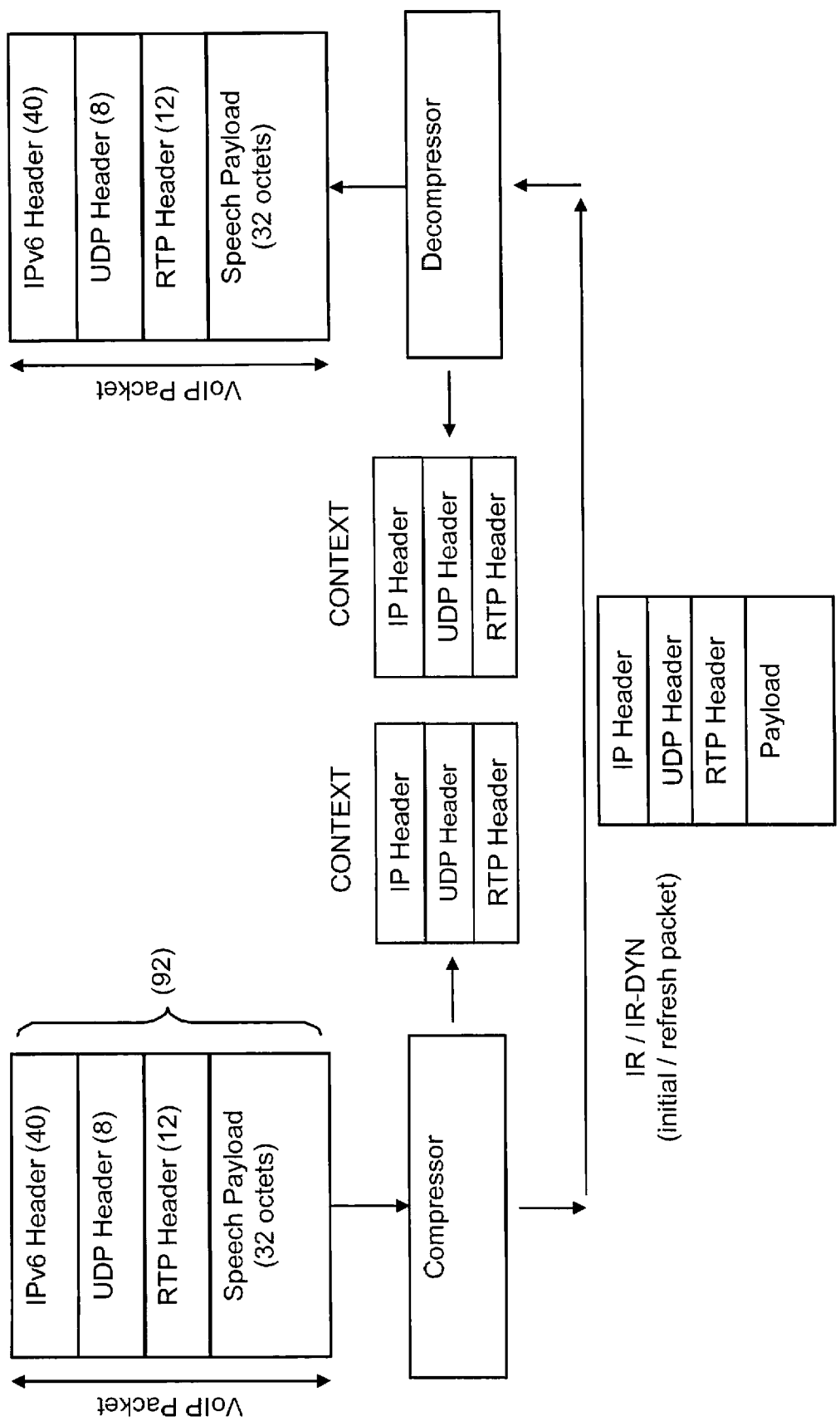
FIG. 2 illustrates a typical example of processing and transmitting audio information between two communication stations in an initial or refresh (IR or IR-DYN) data packet format which can be used in conjunction with the present invention.

FIG. 2 illustrates a typical example of compressing and transmitting audio information between two communication stations in an IR or IR-DYN packet format which can be used in conjunction with the present invention. Each header format, or header type, can have different sizes in turn, depending for example on flags and context information. When the ROHC protocol is used, the compression depends on the assumption that the header compressor has regarding the state of the decompressor and the change patterns of the non-static header information fields of the flow being compressed. Therefore, the size of the compressed headers used by the compressor to convey the necessary information for correct decompression may vary from one packet to another even though the packet format used does not change from one packet to another. Thus, the header size variation cannot be modeled using a deterministic function.

Figure 4:
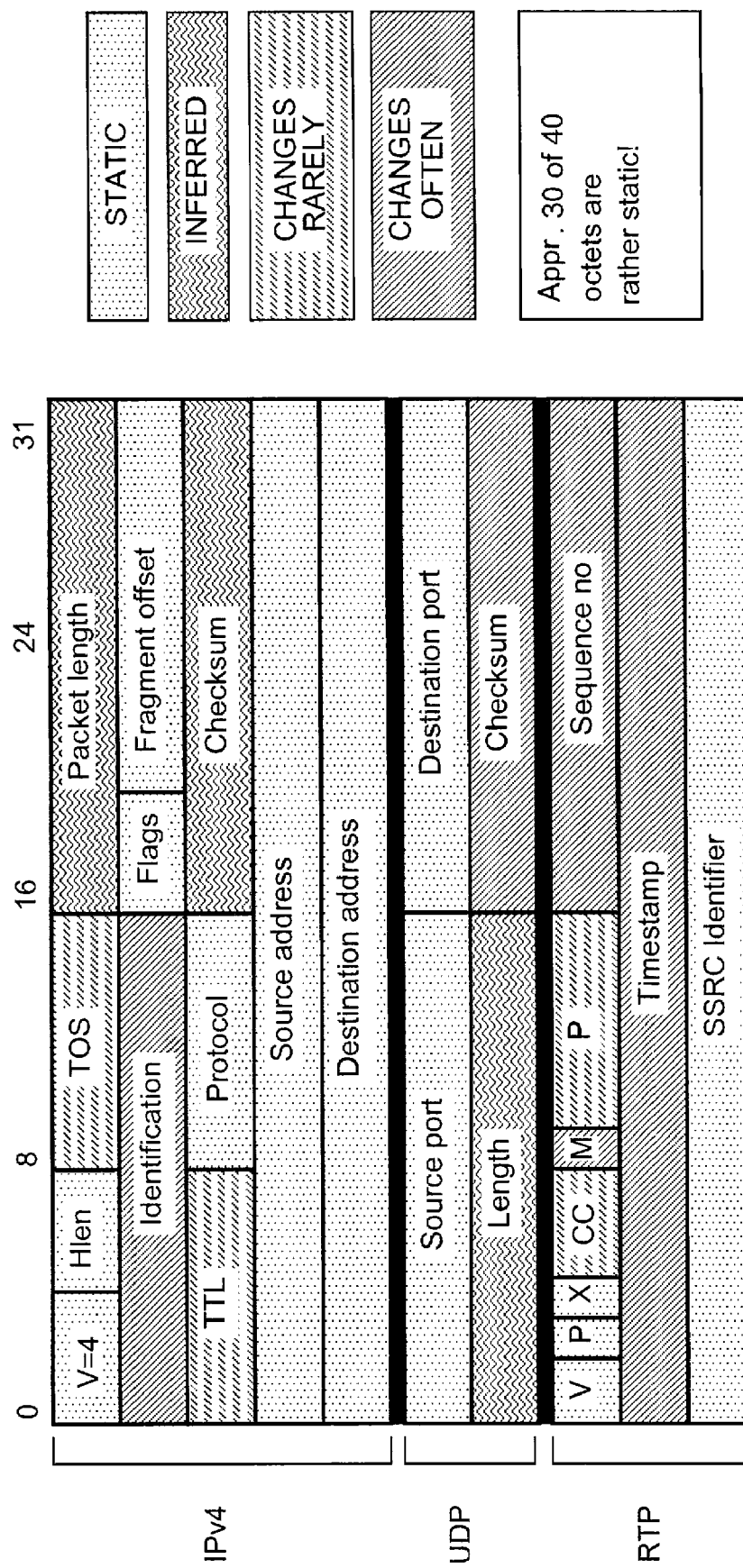
FIG. 4 shows the header information fields of an IPv4/UDP/RTP packet and illustrates typically how often the different header information fields of an IPv4/UDP/RTP packet change.
Figure 5:
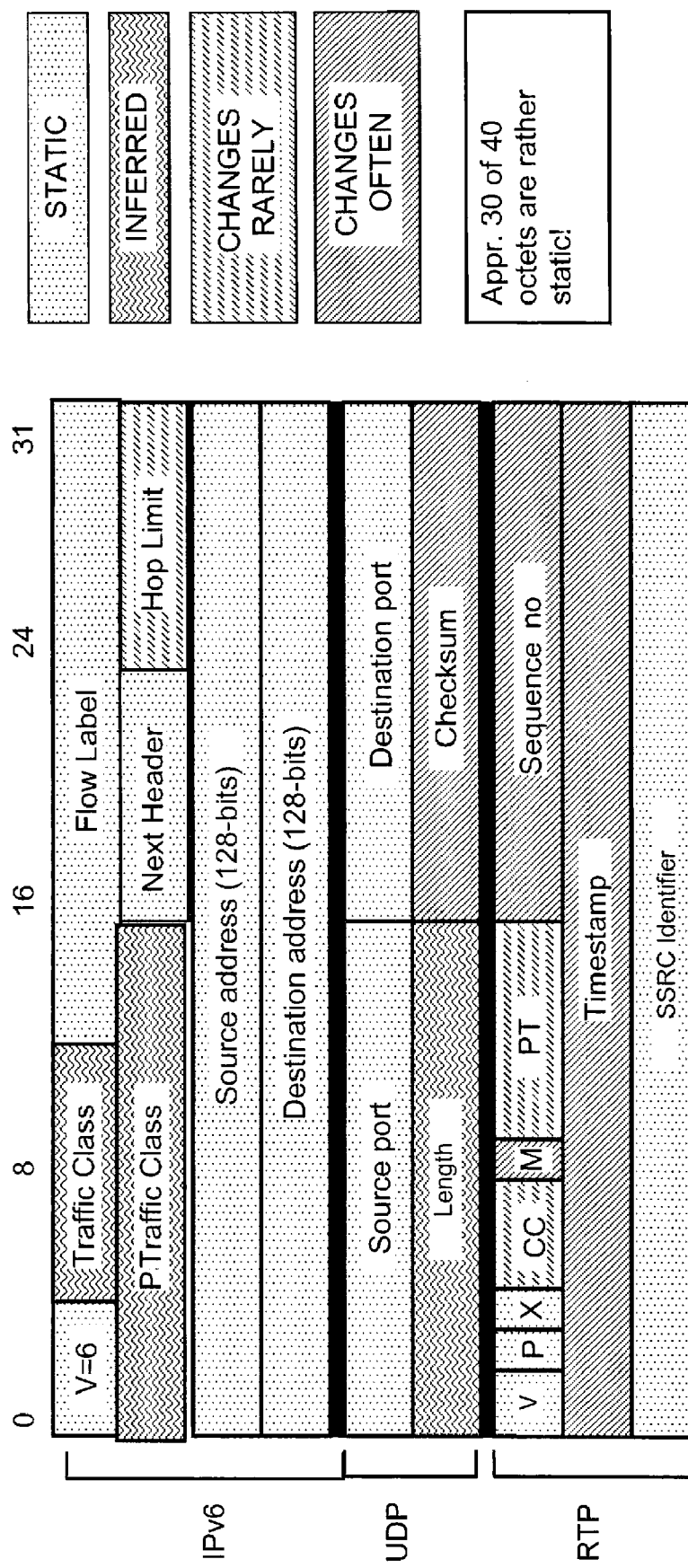
FIG. 5 shows the header information fields of an IPv6/UDP/RTP packet and illustrates typically how often the different header information fields of an IPv6/UDP/RTP packet change.
Figure 6:
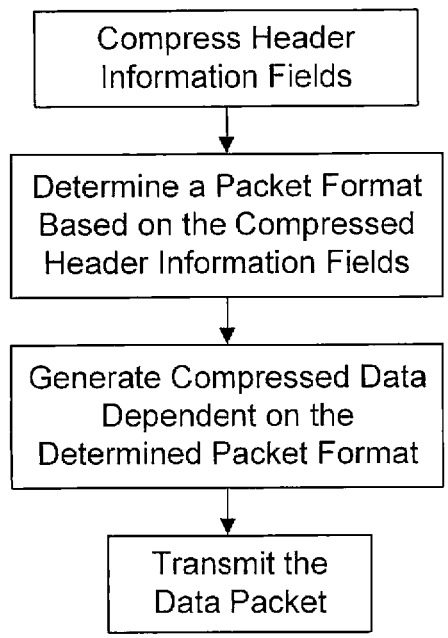
FIG. 6 is a flow chart illustrating the steps of a first exemplary embodiment of the method of the present invention.
Figure 7:
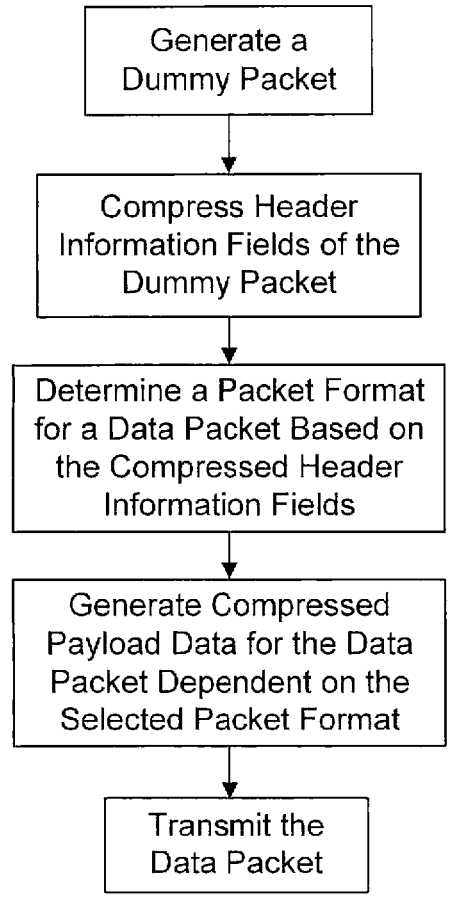
FIG. 7 is a flow chart illustrating the steps of a second exemplary embodiment of the method of the present invention.
Figure 8:
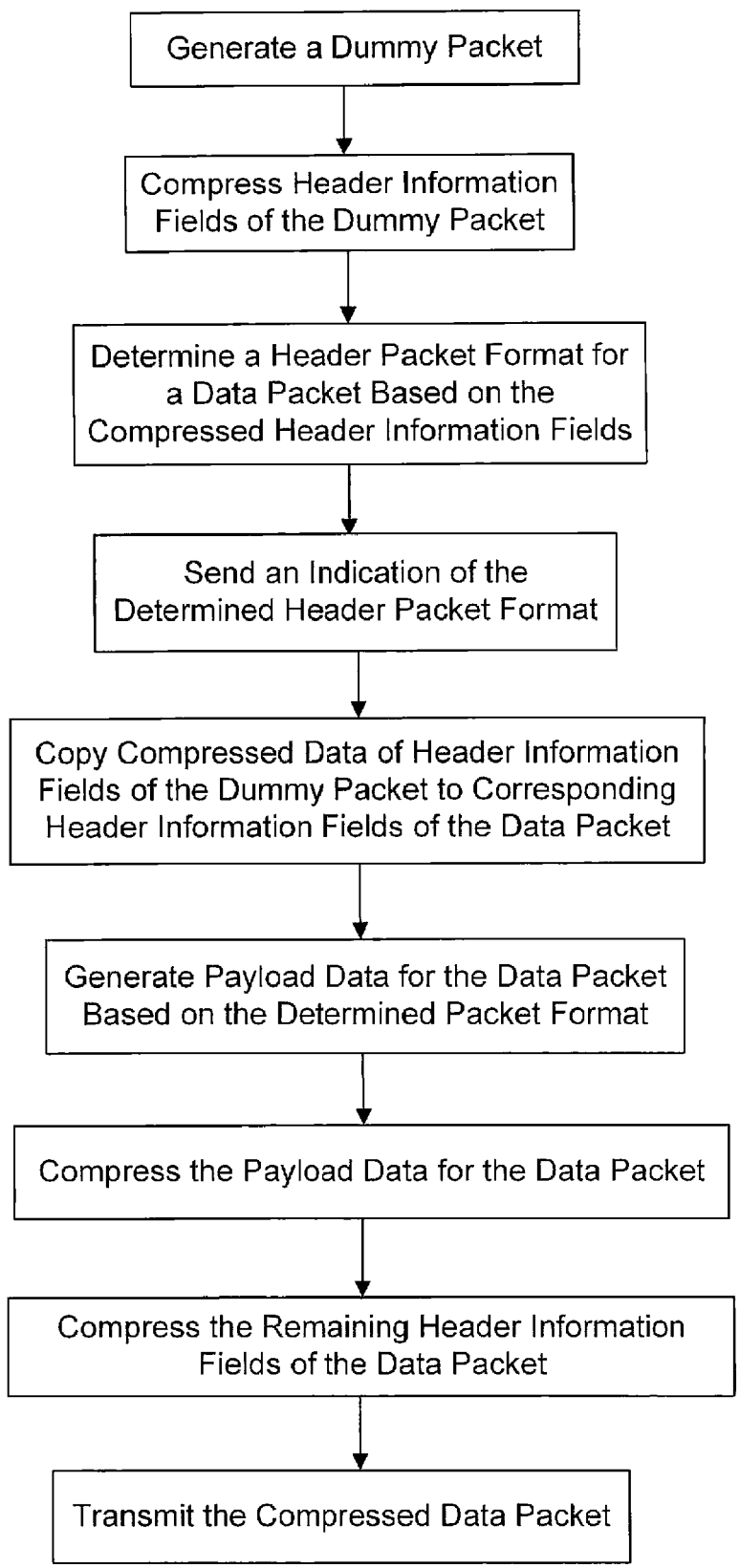
FIG. 8 is a flow chart illustrating the steps of a third exemplary embodiment of the method of the present invention.

FIG. 3 shows structures and possible sizes of different examples of ROHC packet formats which can be used in conjunction with the present invention. Consequently, the compressed header according to the ROHC HC protocol, while providing significant bandwidth savings for most IP headers, will use a variable number of bits for each packet. The size of the IPv4 header basically ranges from the smallest header of one octet, when the UDP checksum is disabled, and up to the size of the original packet+1-2 octets for the IR packets. The size of the header of the IPv6 packet ranges from 3 octets up to the size of the original header+1-2 octets for IR packets. FIGS. 4 and 5 show the header information fields of an IPv4/UDP/RTP header and an IPv6/UDP/RTP header, respectively.

FIGS. 4 and 5 further illustrate typically how often the different header information fields of the headers change.

The present invention includes how to efficiently split the header compression operation into a preparatory step and a finalization step. According to different embodiments of the present invention, the determining of a packet format of a data packet and/or the compressed payload data of a data packet in a finalization step is based on at least one compressed header information field of a dummy packet in a preparatory step. A dummy packet in the present patent application could refer to a data packet which is generated and processed internally within the communication station but which is never transmitted to a receiving unit. A dummy packet in the present patent application could also refer to a data packet comprising zeroes or dummy data as payload data.

According to preferred embodiments of the present invention, the selection of header format for a dummy packet determines the packet format, e.g. the header packet format, and/or size of the compressed header for a data packet. Once the size of the fully or partially compressed header part of the dummy packet is known, then the header generator module in the communication station may signal back to the payload generator module what is needed for the application to generate payload data of adequate size for the final data packet.

According to various embodiments, the present invention is directed to a method of using application interaction with the header compressor, e.g. the ROHC header compressor, in the communication station, especially a feedback signal from the header compressor to the application indicating the size of a compressed header for adjustment of the compression rate, instant or average, of a multi-rate, or scalable codec.

According to particular embodiments of the present invention, internal cross-layer signaling from a header generator module to a payload generator module in the communication station is used for signaling information related to the packet format, e.g. the header packet format, of the data packet. The cross-layer signaling may also be used to signal information as input to the rate controller in a multi-mode, or scalable codec, to allow for higher bandwidth for intermittent ROHC bandwidth needs, resulting in a higher quality representation. The estimation of ROHC external bandwidth needs may also be based on application internal signaling using the Real-Time Control Protocol (RTCP) or the Session Initiation Protocol (SIP).

Examples of in-call bandwidth needs are SIP-messages (REGISTER, UPDATE, REINVITE are sent to keep the SIP session alive) as well as the selection by the ROHC compressor of an IR or an IR-DYN compressed header type. ROHC IR-DYN are sent periodically (unidirectional operation) when NACKs are received (bidirectional operation) or when the change patterns of the flow requires it.

According to the present invention, the at least one header compressor in the communication station does not really need to know the payload size until the very last stages of formatting the bits for link transmission, The payload size is only required for the checksum calculation that protects the decompression process—this checksum is calculated over the entire original header, including the IP length field, and makes the decompression robust. It is therefore possible to let the ROHC compressor split its work into two distinctive steps. A compression step, where the ROHC packet format/type including the final size of the compressed header is identified and a packetization step where the compressed header format is finalized with the robustness information and transport layer checksums. In between these two steps a rate controller may be used to adjust the encoder to provide a bit rate that is best suited for the available instant bandwidth.

Figure 9:
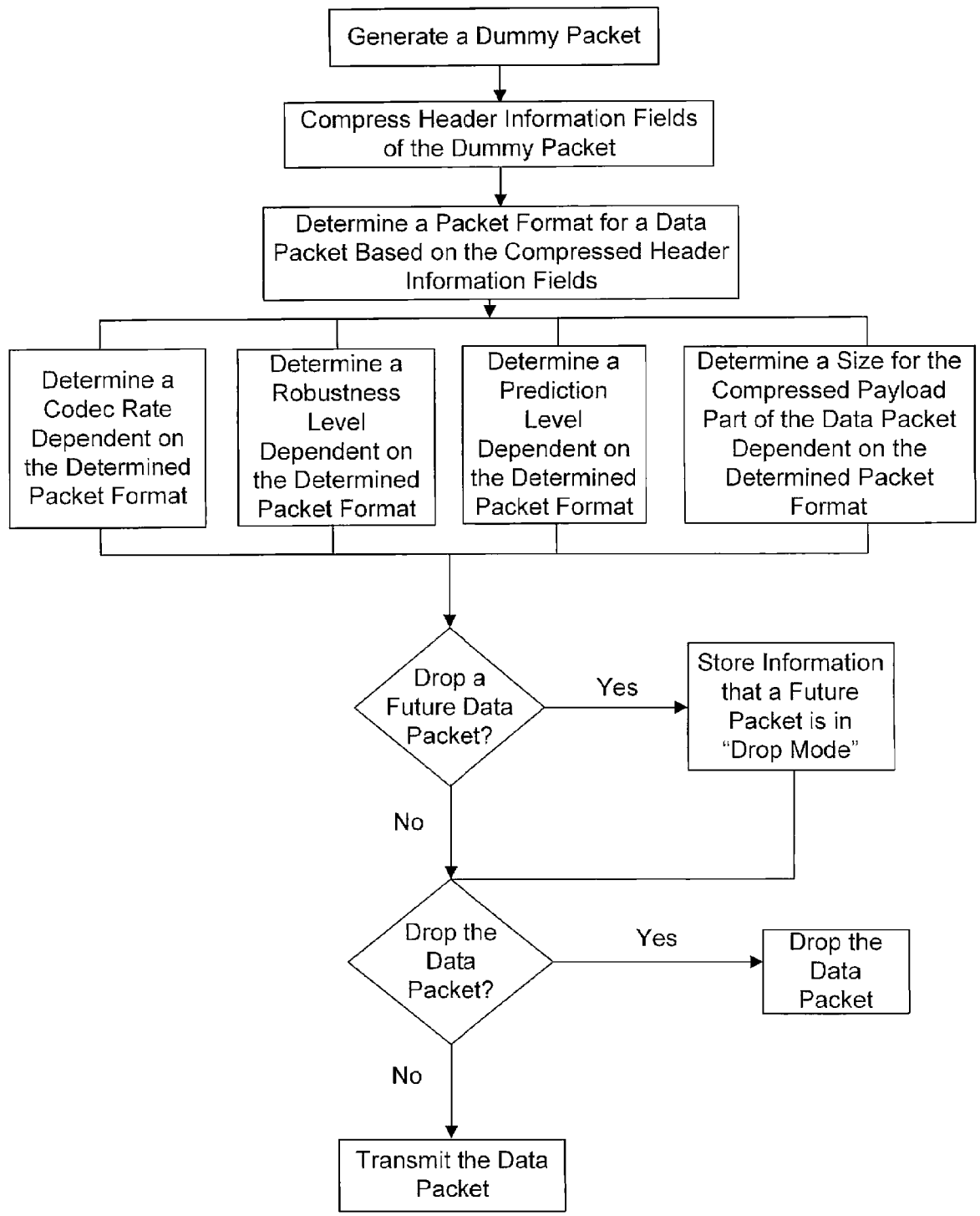
FIG. 9 is a flow chart illustrating the steps of a fourth exemplary embodiment of the method of the present invention.

According to various embodiments, the present invention provides for a method and a communication station where a header packet format is first determined based on at least one compressed header information field of a dummy data packet. In a following step according to the method, see e.g. FIG. 9, the communication station determines a robustness level, prediction level and/or a size for the compressed payload part of a data packet dependent on said determined packet format, which may be a header packet format. The method may also include further steps for determining whether or not to drop a data packet, whether or not to use inter-coding for encoding the data packet and/or a data packet following the data packet.

FIGS. 6, 7, 8 and 9 illustrate exemplary flow charts according to the different embodiments of the present invention described above. Such figures are self-explanatory to those having ordinary skill in the art.

Figure 10:
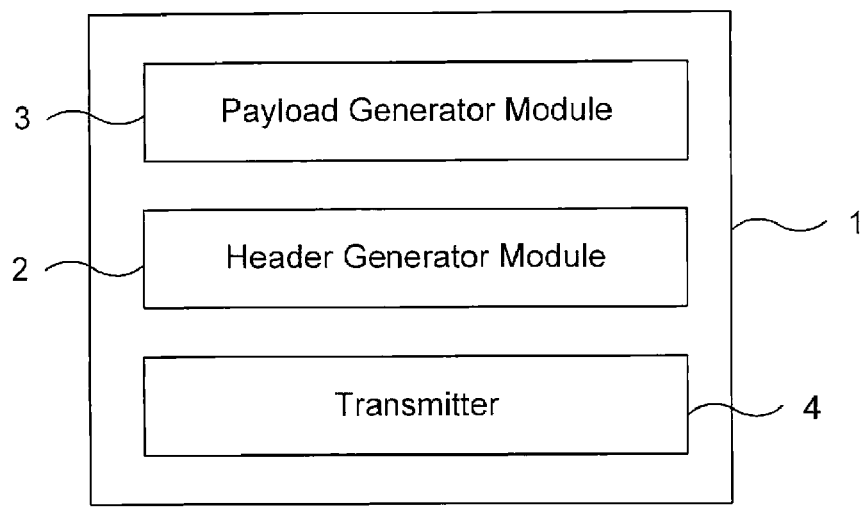
FIG. 10 illustrates an exemplary block diagram of a communication station according to one embodiment of the present invention.

FIG. 10 shows a block diagram of a communication station 1 according to the present invention. The communication station 1 includes a header generator module 2 for determining a packet format for the header part of a data packet based on a compressed header information field. The communication station 1 also includes a payload generator module 3 for generating payload data for the data packets, and a transmitter 4 for transmitting data packets.

Figure 11:
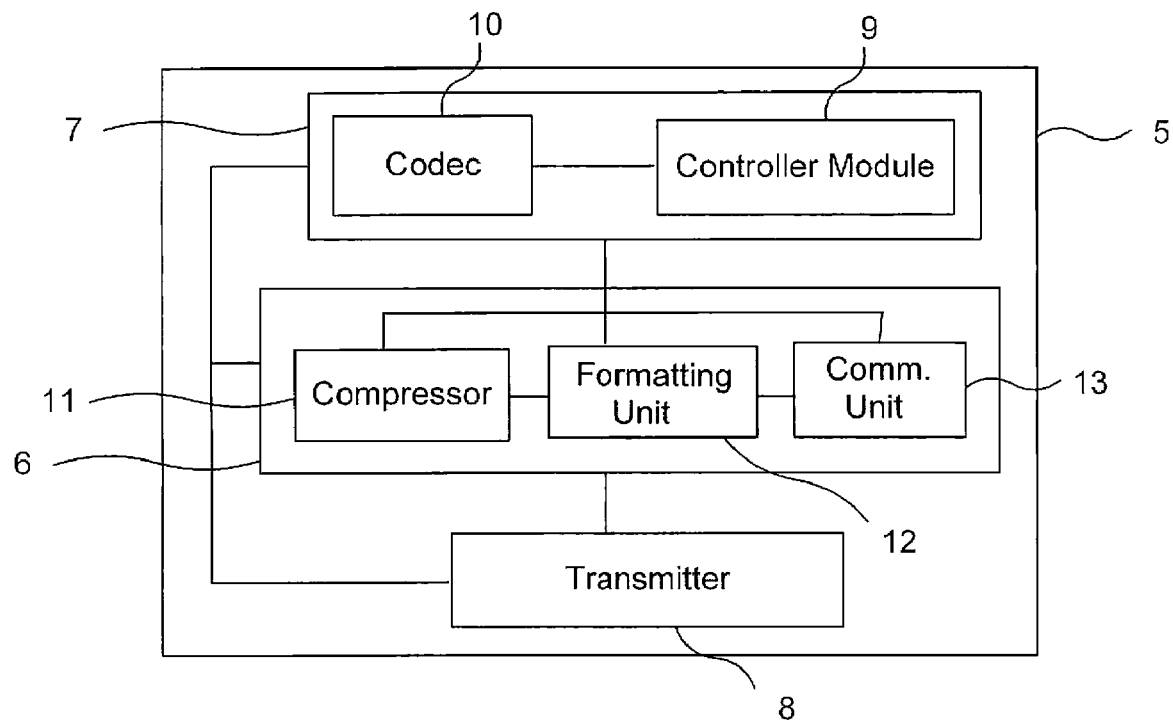
FIG. 11 illustrates an exemplary block diagram of a communication station according to one embodiment of the present invention.

FIG. 11 shows a block diagram of a communication station 5 according to the present invention. The communication station 5 includes a header generator module 6 for determining a packet format for a data packet based on a compressed header information field. The communication station 1 also includes a payload generator module 7 for generating payload data of a data packet, and a transmitter 8 for transmitting data packets. The payload generator module 7 includes a controller module 9 for controlling and generating payload and header data, and a codec 10 for encoding and decoding audio or audiovisual data. The generated payload data in the payload generator module 7 may be, for example, audio and/or audiovisual data. The header generator module 6 includes a compressor 11 for compressing data, a formatting unit 12 for determining a packet format for the data packet, and a communication unit 13 for sending an indication of the determined packet format to the payload generator module 7. Based on the received indication of the packet format, the controller module 9 may also determine the adequate robustness level and prediction level for the application, e.g. whether or not the codes 10 should use inter-coding for encoding the data packet to be generated and/or a following data packet to be generated.

Figure 12:
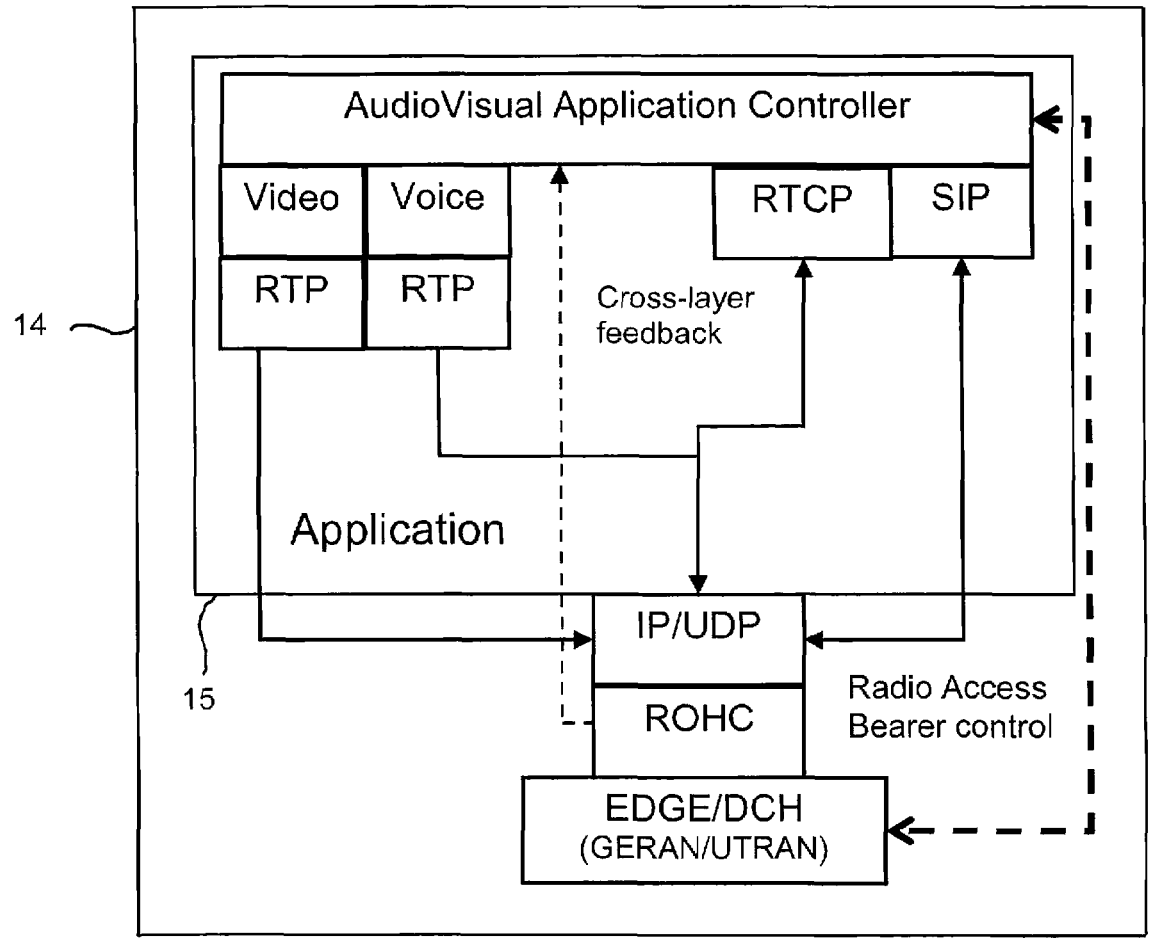
FIG. 12 illustrates an exemplary block diagram and process flows for processing audio or audiovisual information according to various embodiments of the present invention.

FIG. 12 illustrates an exemplary block diagram of a communication station 14 and the process flows for processing audio or audiovisual information according to different embodiments of the present invention. The estimation of external ROHC bandwidth needs to be based on cross-layer signals (ROHC) or on application internal signaling, e.g. RTCP or SIP signaling. Straight-forward bandwidth models may also be used within the application 15, e.g. based on the ROHC initialization requirements at session startup and/or the assumptions for additional ROHC compressed information for RTP timestamps at transitions from DTX to activity. In addition, event signals may be used to indicate the bandwidth requirements as well as start and duration for the time-period that the indicated bandwidth requirement is desired.

Figure 13:
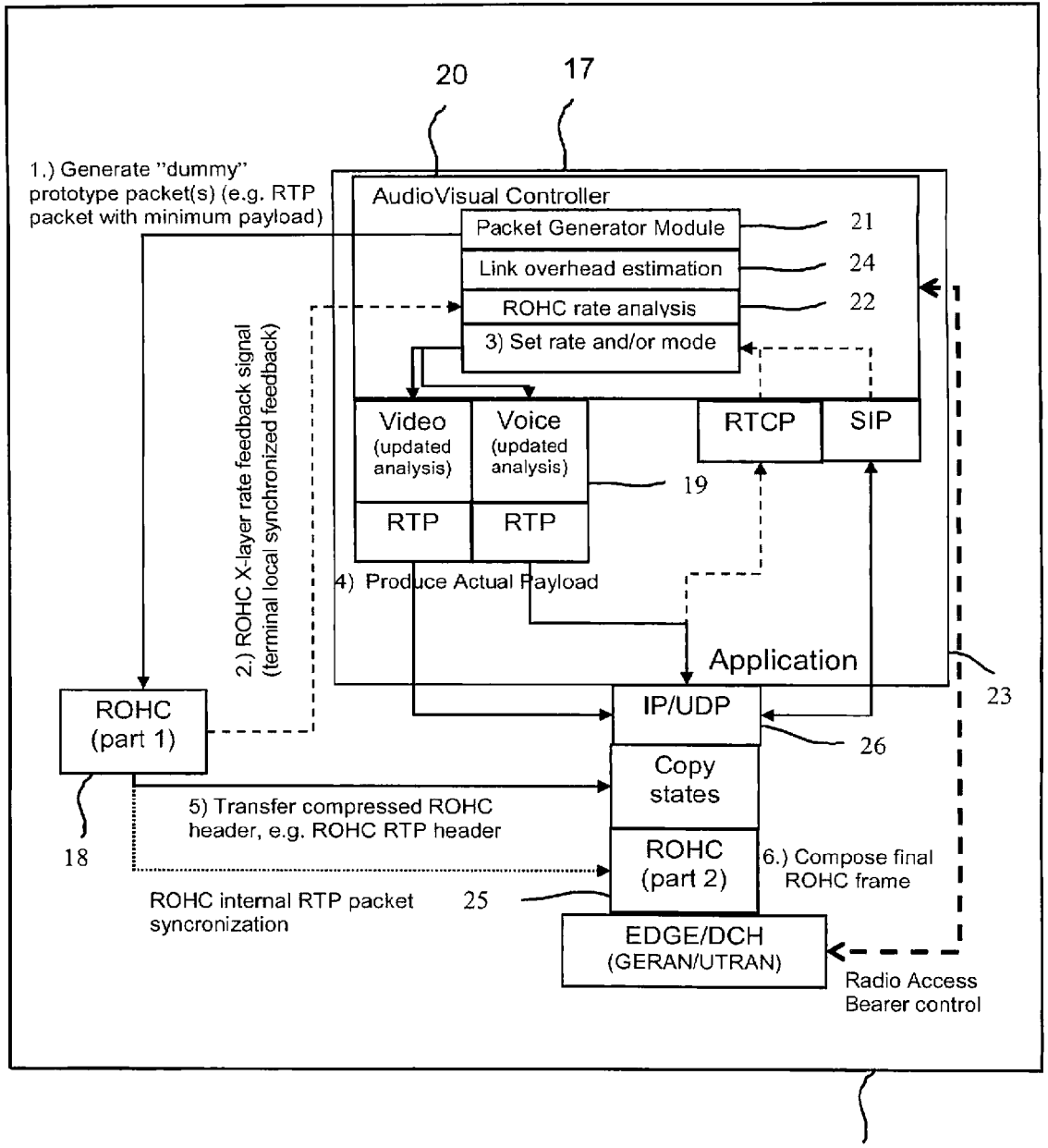
FIG. 13 illustrates an exemplary block diagram and process flows for processing audio and/or audiovisual information according to various embodiments of the present invention.

FIG. 13 illustrates an exemplary block diagram of a communication station 16 and the process flows for processing audio or audiovisual information according to different embodiments of the present invention.

The communication station 16 in FIG. 13 according to a first embodiment of the present invention performs the following operations:

1) The application 17 prepares a dummy RTP packet (with zero or dummy payload) and sends it to a preparatory ROHC compressor 18.
2) The ROHC compressor 18 compresses the header information and signals the application 17 what the size of the compressed header will be, according to the header of the dummy RTP packet that was given to it.
3) The application 17 sets the appropriate rate for the multi-rate, or scalable, voice/video codec(s) 19.
4) The codec(s) 19 provide the actual compressed payload.
5) The second step of ROHC processing is started by reusing the headers from the preparatory step. The RTP/UDP/IP header, except for the IP length field, must be the exact same as the one in the compression step.
6) In the packetization step, the ROHC checksum is calculated using the total size of the RTP packet including the application payload. Then, the RTP payload is composed together with the already prepared ROHC header to form a final data packet for the link layer.
7) The link layer frame is transmitted (not shown).

The communication station 16 in FIG. 13 consists of an AudioVisual Controller 20 comprising a packet generator module 21 and a rate analysis module 22, e.g. a ROHC rate analysis module. The packet generator module 21 in the application 23 can generate the next IP header to be used, with all fields having their correct values, including sampling instant and sequence number, except for the length information. The length information cannot be part of this information because it is derived from the "codec rate" used for the corresponding packet. This corresponds to the Link overhead estimation box 24 in the AudioVisual Controller 20 of the application 23.

According to various embodiments, the invention may be implemented using one or a plurality of header compressors and each of the header compressors can operate in two sequential steps so that each header compressor module performs compression step 1 and compression step 2, as defined below.

According to yet another embodiment of the invention, a first header compressor module 18 in FIG. 13 performs compression step 1, which algorithm starts at a certain entry point and may be stopped at a subsequent exit point. A second header compressor module 25 may restart subsequently to perform compression step 2 provided correct information is given at the algorithm's re-entry point. A rate analysis module 22 in the application 23 may then select the most suitable codec rate based on information received from the first header compressor module 18. In the exemplary FIG. 13, there is a first interface between the packet generator module 21 and the first header compressor module 18, over which the next IP header can be provided from the packet generator module 21 to the compressors entry point. There is also shown a second interface between the first header compressor module's exit point and the rate analysis module 22, over which information on the type of compressed header selected in compression step 1 is provided—including the size of the compressed header selected for the next IP header. A third interface between the application 23 and the second header compressor 25, over which the final application packet—that consist of the next IP header and the proper application payload, may be provided to the second header compressor's re-entry point. This may be done via the usual IP stack, represented by the box "IP|UDP" 26 in FIG. 13.

The packet generator 21 prepares a dummy RTP packet (with a meaningless payload or no payload at all) corresponding to the next IP header that the application 23 will use for the next frame, and passes the dummy RTP packet via the first interface to the entry point of the first header compressor module 18, which e.g. could be a ROHC compressor. The information that depends on the size of the payload is either not filled or zeroed and includes the following fields:

the UDP checksum, which is calculated over the actual payload bits (if enabled for IPv4).
the UDP length field, which requires knowledge of the size of the payload.
the IP length field, which requires knowledge of the size of the payload.
the IPv4 checksum field, which requires knowledge of the exact values of all fields in the IP header.
the payload, which data is not yet generated by the application codec.

The first header compressor module 18 performs compression step 1. Compression step 1 consists of all of the normal compression steps mandated by the compression algorithm in use, for example the ROHC algorithm, from the algorithm's entry point up to the point where the value of the fields in the IP header that depend on the size of the payload, e.g. the IP length and the UDP length, which are needed for the computation of the compressed header, i.e. the exit point. Specifically, a ROHC compressor may compress up to the point where the final compressed header format gets selected and the header is filled with compressed values of all fields except for the UDP checksum, which is calculated over the actual payload bits (if enabled for IPv4), and the ROHC Cyclically Redundancy Checksum (CRC), which is calculated over the complete, uncompressed header for non-IR packets.

It should be noted that, according to this embodiment of the present invention, the IPv4 checksum field is never sent in the compressed headers. It is recalculated by the decompressor after successful decompression. The UDP length and IP length fields are never sent either as they are inferred from the link layer. However, their exact value must be known for non-IR packets when calculating the ROHC CRC since they are all part of information protected by the 3- and 7-bit CRC. The calculations and the coverage of the CRC for any protocols, e.g. various HC protocols or the UDP protocol, or profiles, e.g. the ROHC profiles, is specific to the protocol and/or profile itself, so other ways of calculating the CRC may be defined in other protocols or profiles.

The first header compressor module 18 signals the rate analysis module 22 in the application 23, via the second interface, what the size of the selected compressed header type is, according to the next IP header that the application 23 provided. The rate analysis module 22 in the application 23 may then set the appropriate rate for the multi-rate, or scalable, codec(s) 19. The codec(s) 19 generates the actual voice and/or audio and/or video compressed payload, and the application 23 then passes to the second header compressor module, via the third interface, either:

only the generated payload as a complement to the next IP header that the compressor already received, or the now complete "next" IP packet, whose header has the exact same values as the next IP header that was originally used except for the values related to the size of the payload, which now have their real values.

The second header compressor module 25 in FIG. 13 then performs compression step 2. Compression step 2 consists of the remainder of the compression process, i.e. from the algorithms re-entry point and including in the specific case of ROHC at least one of the following operations:

filling the correct value of the UDP checksum in the compressed header (if enabled for IPv4).

calculating the ROHC CRC over the complete, uncompressed header for non-IR packets.

final packetization of the compressed packet, where the application payload, e.g. RTP payload, is composed together with the already prepared ROHC compressed header to form a final transmission frame, or data packet, for the link layer.

This "reuses" the headers from the preparatory step. The RTP/UDP/IP header, except for the IP and UDP length fields, IPv4 and UDP checksum, must be the exact same as the one in compression step 1.

The invention according to the embodiments of FIG. 13 presented above describes a two-step procedure involving a bidirectional signaling as a closed feedback loop between the codec and the header compressor using e.g. a simple Application Protocol Interface (API), where the application pre-fetches the IP headers ahead of the generation of the encoded speech for the purpose of getting back from the compressor the information necessary to determine the rate of the encoding for the current audio or video frame, aiming to generate as constant as possible bit rate over the channel.

Figure 14:
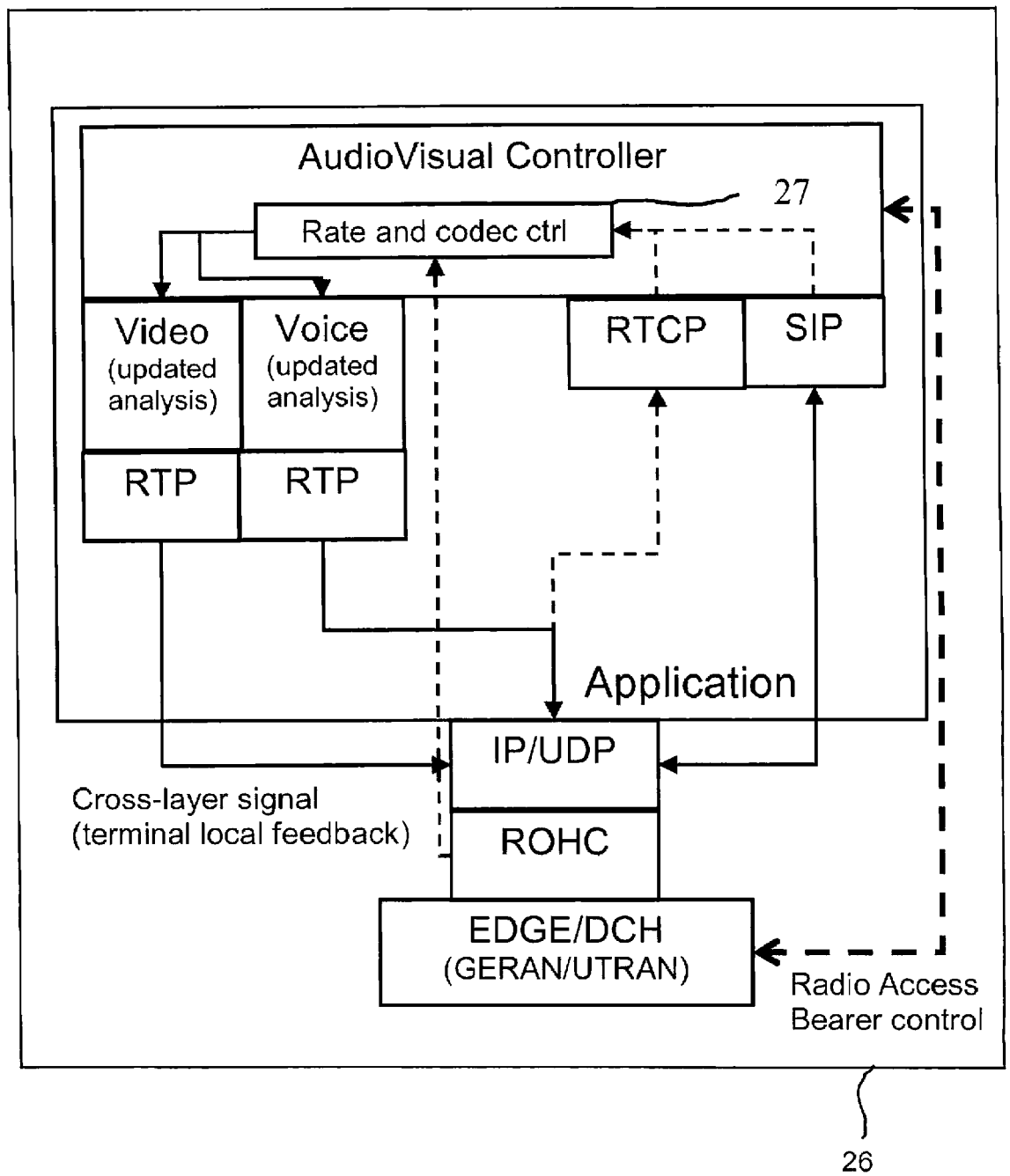
FIG. 14 illustrates an exemplary block diagram and process flows for processing audio and/or audiovisual information according to various embodiments of the present invention.

FIG. 14 illustrates an exemplary block diagram of a communication station 26 and process flows for processing audio or audiovisual information according to different embodiments of the present invention. When receiving cross-layer signaling, e.g. ROHC-related signaling, or application internal signaling, e.g. RTCP or SIP signaling, the rate and codec control module 27 in FIG. 14 may adapt the rate and/or codec mode of the application used. As previously mentioned, the AMR-NB and AMR-WB codecs have the possibility to run with several different coding modes. In the AMR-NB case, the possible bit rates span over the range 4.75 kbps to 12.2 kbps.

At startup or when receiving a cross-layer signal corresponding to the upcoming use of an IR (or IR-DYN), or when a SIP bandwidth need signal is present, the source compressed max rate may be adapted. The AMR-NB max rate controller is reduced to the minimum available codec mode in the active codec mode set e.g. AMR 5.9. In forced SID-UPDATE transmission, there is often only background noise present, initial speech frames which can be replaced by one or a few pre-computed SID_UPDATE frames. Alternatively, the SID_UPDATE frames may be conditionally computed from the input signal or the encoded speech parameters. Every SID_UPDATE packet after the initial SID_UPDATE may be suppressed for a period of up to 980 ms.

Due to backward compatibility with e.g. GSM-EFR Silence InDicator (SID) quantization the AMR-NB and AMR-WB encoders often start up a session with at least 7 speech frames. Various embodiments of the invention force the encoder to start with the lowest possible bandwidth consumption, if that is needed, and thus ensure that the ROHC initialization packets are transmitted over the radio network as fast as possible. The easiest solution is to always force the codec to run with the lowest possible bit rate in the beginning of the session for a pre-specified time. The encoder may also be forced to send out only intermittent low rate SID_UPDATE frames first in the beginning of the session. Essentially any of the following actions may be taken:

At startup or when receiving a cross-layer signal corresponding to the upcoming use of an IR (or IR-DYN) by the ROHC compressor, or when a SIP bandwidth need signal is present, the source compressed max rate may be adapted.

The max rate controller is reduced to the minimum available codec mode in the active codec mode set, e.g. AMR5.9 for AMR-NB.

In forced low rate frame transmission, e.g. SID-UPDATE transmission when there is only background noise present, initial speech frames can be replaced by one or a few pre-computed low-rate frames, e.g. SID_UPDATE frames alternatively SID_UPDATE frames, and the low rate frames, e.g. SID frames, may be conditionally computed from the input signal or the encoded speech parameters.

Every SID_UPDATE packet after the initial SID_UPDATE may be suppressed for a period of up to 980 ms.

Figure 15:
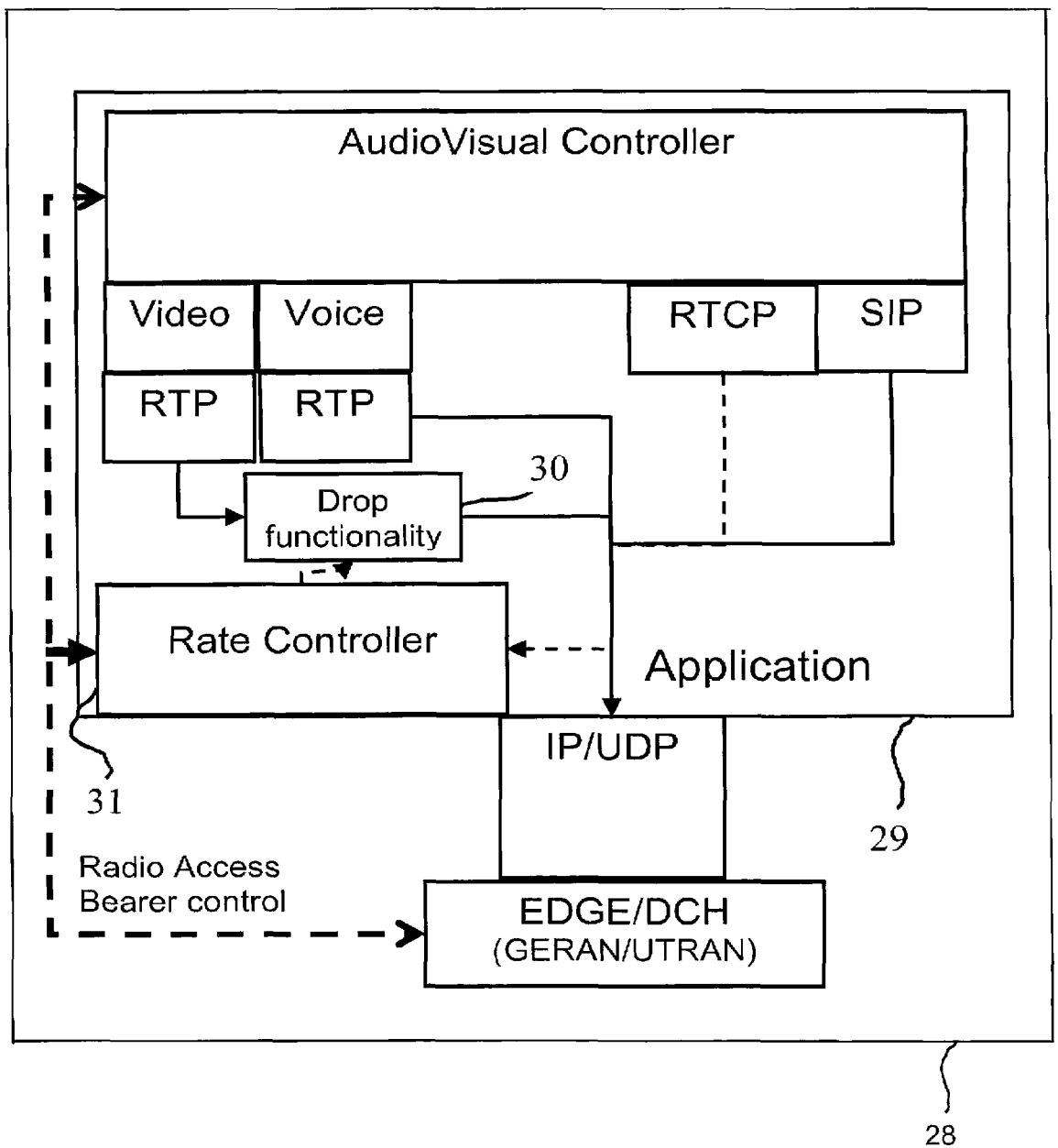
FIG. 15 illustrates an exemplary block diagram and process flows for processing audio and/or audiovisual information according to various embodiments of the present invention.

If drop functionality is available, see the drop functionality module 30 in FIG. 15, frames indicated as less important are skipped by the encoder.

When the event times out, the controller returns the encoder and packetizer to its initial quality optimization state. Any of the methods above may be reused, it is however much less likely to get away with forced low-rate frame transmission, e.g. SID_UPDATE transmission, without degrading the quality to a great extent.

If a drop classifier is available, see e.g. drop functionality module 30 in FIG. 15, frames indicated as less important are skipped by the encoder. Based on a received indication of a packet format to be used for a data packet to be generated, the application 31 may first also determine the adequate robustness level and prediction level for the application which in turn also could determine whether or not the drop functionality module 30 should drop the data packet to be generated and/or drop a following data packet to be generated.

FIG. 15 illustrates an exemplary block diagram of a communication station 28 and process flows for processing audio or audiovisual information according to one embodiment of the present invention. The application 29 comprises a drop functionality module 30 and a rate controller module 31 aggregating all traffic, e.g. UDP traffic. The estimated bandwidth is used to control a selective drop of packets such as e.g. video packets. The selective drop of packets could be very useful mainly because of the very large variance of e.g. video packets and is even more important when the application is using a strictly band-limited channel. This embodiment of the invention can be characterized as a type of cross application rate controller working on an aggregated transport layer, e.g. UDP. An alternative embodiment of the invention would be to include instant needs, e.g. instant ROHC needs, through cross-layer communication within the communication station 28.

The present invention provides a solution for faster startup of a session, lowered control channel startup delay and lowered media stream delay variation resulting in lowered average delay and lowered erasure rate for the media stream.

One of several other advantages with the present invention is that packets larger than the most frequent and optimally compressed packets, e.g. the ROHC IR/IR-DYN packets, are transmitted faster over bottleneck links, resulting in a faster startup and reduced bandwidth fluctuations. This essentially implies that a prioritization of updates, e.g. ROHC updates, is achieved without using a bearer that supports transport layer prioritization. The invention is applicable for communication of various data types such as audio, still image, text messaging, and video data but it should be noted that the header compression overhead is often relatively larger for audio communication.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A method of compressing and transmitting a finalized data packet from a communication station having an application controller that controls a payload generator module and a header generator module, wherein the finalized data packet includes a payload information part and a header information part, the header information part including a plurality of header information fields, the method comprising:

creating by the application controller, a preparatory packet having a header and an uncompressed preparatory payload;

compressing the preparatory packet header by the header generator module;

computing by the application controller, a resulting header overhead for the compressed preparatory packet header;

determining by the application controller, a media codec rate based on the computer header overhead;

creating by the paylaod generator module, a finalized payload;

encoding the finalized payload by the payload generator module at the determined media codec rate;

replacing by the payload generator module, the preparatory payload with the finalized payload to create a compressed finalized packet; and transmitting the compressed finalized packet.

2. The method according to claim 1, wherein the step of compressing the preparatory packet header includes compressing the preparatory packet header by the header generator module utilizing the Robust Header Compression (RoHC).

3. A communication station for compressing and transmitting a finalized data packer having a payload information part and a header information part, the header information part including a plurality of header information fields, the communication station comprising:

a header generator module;

a payload generator module;

an application controller that controls the header generator module and the payload generator module; and a transmitter for transmitting the finalized data packet;

wherein the application controller creates a preparatory packet having a header and an uncompressed preparatory payload;

wherein the header generator module includes a compressor for compressing the preparatory packet header;

wherein the application controller computes a resulting header overhead for the compressed preparatory packet header and determines a media codec rate based on the computed header overhead;

wherein the payload generator module creates a finalized payload, and a codec within the payload generator module encodes the finalized payload at the determined media codec rate;

wherein the payload generator module replaces the preparatory payload with the finalized payload to create a compressed finalized packet; and wherein the transmitter transmits the compressed finalized packet.

4. The communication station according to claim 3, wherein the compressor in the header generator module is a Robust Header Compression (RoHC) compressor.

* * * * *